(12) United States Patent
Ikuta

(10) Patent No.: US 7,007,880 B2
(45) Date of Patent: Mar. 7, 2006

(54) FISHING LINE GUIDE MECHANISM FOR SPINNING REEL

(75) Inventor: Takeshi Ikuta, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/647,537

(22) Filed: Aug. 26, 2003

(65) Prior Publication Data

US 2004/0064998 A1 Apr. 8, 2004

(30) Foreign Application Priority Data

Oct. 7, 2002 (JP) ............................. 2002-293352

(51) Int. Cl.
*A01K 89/01* (2006.01)
(52) U.S. Cl. .................................... 242/230
(58) Field of Classification Search ............... 242/230, 242/231, 232, 233; D22/140, 141
See application file for complete search history.

(56) References Cited

U.S. PATENT DOCUMENTS 5,848,757 A * 12/1998 Amano et al. .............. 242/231
6,311,913 B1 * 11/2001 Yasui et al. .................. 242/231
6,572,042 B1 * 6/2003 Sugawara .................... 242/231
6,637,690 B1 * 10/2003 Matsuda ...................... 242/231

FOREIGN PATENT DOCUMENTS

| EP | 1226754 A | 7/2002 |
| EP | 1228688 A | 8/2002 |
| JP | 10-117644 A | 5/1998 |
| JP | 10117644 A | 5/1998 |

\* cited by examiner

*Primary Examiner*—Kathy Matecki
*Assistant Examiner*—Evan Langdon
(74) *Attorney, Agent, or Firm*—Shinjyu Global IP Counselors, LLP

(57) ABSTRACT

A fixed shaft cover of a bail arm includes a first guide portion that guides line along its outer circumference, and an indented portion that is disposed such that a bail is interposed between it and the first guide portion. The indented portion further includes a second recessed portion disposed to interpose the bail between the second recessed portion and the first guide portion, and a first recessed portion that is disposed at a portion of the fixed shaft cover closest to the spool. The first recessed portion is connected at least partially with the second recessed portion on a side closer to the line roller.

8 Claims, 5 Drawing Sheets

FISHING LINE GUIDE MECHANISM FOR SPINNING REEL

BACKGROUND OF THE INVENTION

1. Field of the Invention

The present invention relates to a fishing line guide mechanism. More specifically the present invention relates to a fishing line guide mechanism of a spinning reel for guiding fishing line to a spool.

2. Background Information

A spinning reel is conventionally provided with a mechanism for guiding fishing line onto a spool. The fishing line guide mechanism is mounted to the ends of a first rotor arm and a second rotor arm. The fishing line guide mechanism rotates together with the rotor and is pivotable between a line-release position and a line-winding position. The fishing line guide mechanism usually includes a first bail support member of the fixed shaft, a second bail support member, a fixed shaft, a fixed shaft cover, a wire-shaped bail, and a line roller. One end of the fixed shaft is fixed to the end of the first bail support member. The fixed shaft cover is fixed to the other end of the fixed shaft. One end of the wire-shaped bail is attached to the fixed shaft cover. The other end of the bail is attached to the end of the second bail support member. The bail is conventionally disposed such that it curves outward in the circumferential direction of the spool as shown in Japanese Patent Application Publication 10-117644.

In order to wind fishing line around the spool of a spinning reel having such a fishing line guide mechanism, the bail is pivoted into the line-winding position and the handle is turned. When this occurs, the fishing line is led by the bail and guided over the fixed shaft cover to contact the outer peripheral surface of the line roller. Then, guided by the line roller, the direction of the fishing line is changed, and it is wound around the spool.

In conventional fishing line guide mechanisms, when, for example, the tackle becomes caught on a large object a large amount of tension is applied to the fishing line when the operator tries to wind the fishing line. Consequently, the line roller is pushed inward toward the spool by the fishing line. Thus, when the line roller is pushed toward the spool, the fixed shaft cover may come into contact with the spool. If the fixed shaft cover comes into contact with the spool, there is a possibility that the fishing line will not be smoothly guided onto the spool.

Accordingly, maintaining a large gap between the spool and the fixed shaft cover in order to make it difficult for the fixed shaft cover to come into contact with the spool has been considered as shown in Japanese Patent Application Publication 10-117644. However, when the gap between the spool and the fixed shaft cover is enlarged, the overall size of the reel will increase.

In view of the above, there exists a need for a fishing line guide mechanism for a spinning reel that overcomes the above-mentioned problems in the prior art. This invention addresses this need in the prior art as well as other needs, which will become apparent to those skilled in the art from this disclosure.

SUMMARY OF THE INVENTION

It is an object of the present invention to control, minimize, or prevent an increase in the overall size of a spinning reel having a fishing line guide mechanism, while preventing the fixed shaft cover from coming into contact with the spool.

The fishing line guide mechanism for a spinning reel according to a first aspect of the present invention guides fishing line onto a spool, and is mounted to the ends of a first rotor arm and a second rotor arm so as to be pivotable between a line-guiding position and a line-release position. The fishing line guide mechanism includes a first bail support member, a second bail support member, a fixed shaft, a fixed shaft cover, a line roller, and a bail. The first and second bail support members are pivotably mounted to respective ends of a first rotor arm and a second rotor arm. The fixed shaft has first and second ends. The first end is fixedly coupled to the first bail support member. The fixed shaft cover is fixedly coupled to the second end of the fixed shaft, and spaced apart from the first bail support member. The line roller is rotatively supported on the fixed shaft. A roller is formed in the line roller that guides the fishing line around its peripheral surface. The bail has first and second ends. The first end is fixedly coupled to the second bail support member. The second end is fixedly coupled to at least one of the fixed shaft and the fixed shaft cover. The bail is curved outward in a circumferential direction with respect to the spool, and guides the fishing line over the fixed shaft cover to the line roller. The fixed shaft cover includes a first guide portion that is configured to guide fishing line around the outer periphery thereof, and a first recessed portion that is disposed such that the second end of the bail is disposed between it and the first guide portion. The first recessed portion is formed by making a portion of the fixed shaft cover closest to the spool recessed.

In this fishing line guide mechanism, the fixed shaft cover includes a first recessed portion that is disposed such that the bail of the fixed shaft cover is interposed between the recessed portion and the first guide portion. Further, the first recessed portion is formed as an indented portion in the side opposite the first guide portion at a point closest to the spool. Here, since the fixed shaft cover includes a first recessed portion which is an indented portion at a point closest to the spool, a sufficient gap is maintained between the spool and the fixed shaft cover. Further, the overall size of the reel will not have to be increased relative to conventional reels, and the fixed shaft cover can be prevented from coming into contact with the spool.

A fishing line guide mechanism according to a second aspect of the present invention is the fishing line guide mechanism according to the first aspect, in which the fixed shaft cover further includes a second recessed portion. The second recessed portion is disposed such that the bail of the fixed shaft cover is interposed between the second recessed portion and the first guide portion. Further, the first recessed portion is disposed such that it is connected with at least one portion of the second recessed portion on a side closer to the line roller. In this situation, the spinning reel can be made lightweight by forming the first recessed portion in the fixed shaft cover, and the fixed shaft cover can be prevented from coming into contact with the spool by forming the second recessed portion in the fixed shaft cover.

A fishing line guide mechanism according to a third aspect of the present invention is the fishing line mechanism of the second aspect, in which the fixed shaft cover further includes a conical portion and a cylindrical portion. The conical portion is smoothly joined with the second end of the bail near the apex of the conical portion. The cylindrical portion is smoothly attached to the bottom surface of the conical portion on the side closer to the line roller, and has a diameter that is substantially equal that of the bottom surface of the conical portion. Further, the second recessed portion is preferably formed in the conical portion, and the first recessed portion is preferably formed in the cylindrical portion. In this situation, when for example the first recessed portion and the second recessed portion are linked smoothly together, the fixed shaft cover can reliably prevent contact with the spool because the first and second recessed portions are respectively formed in the portion connecting the cylindrical portion and the conical portion closest to the spool.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
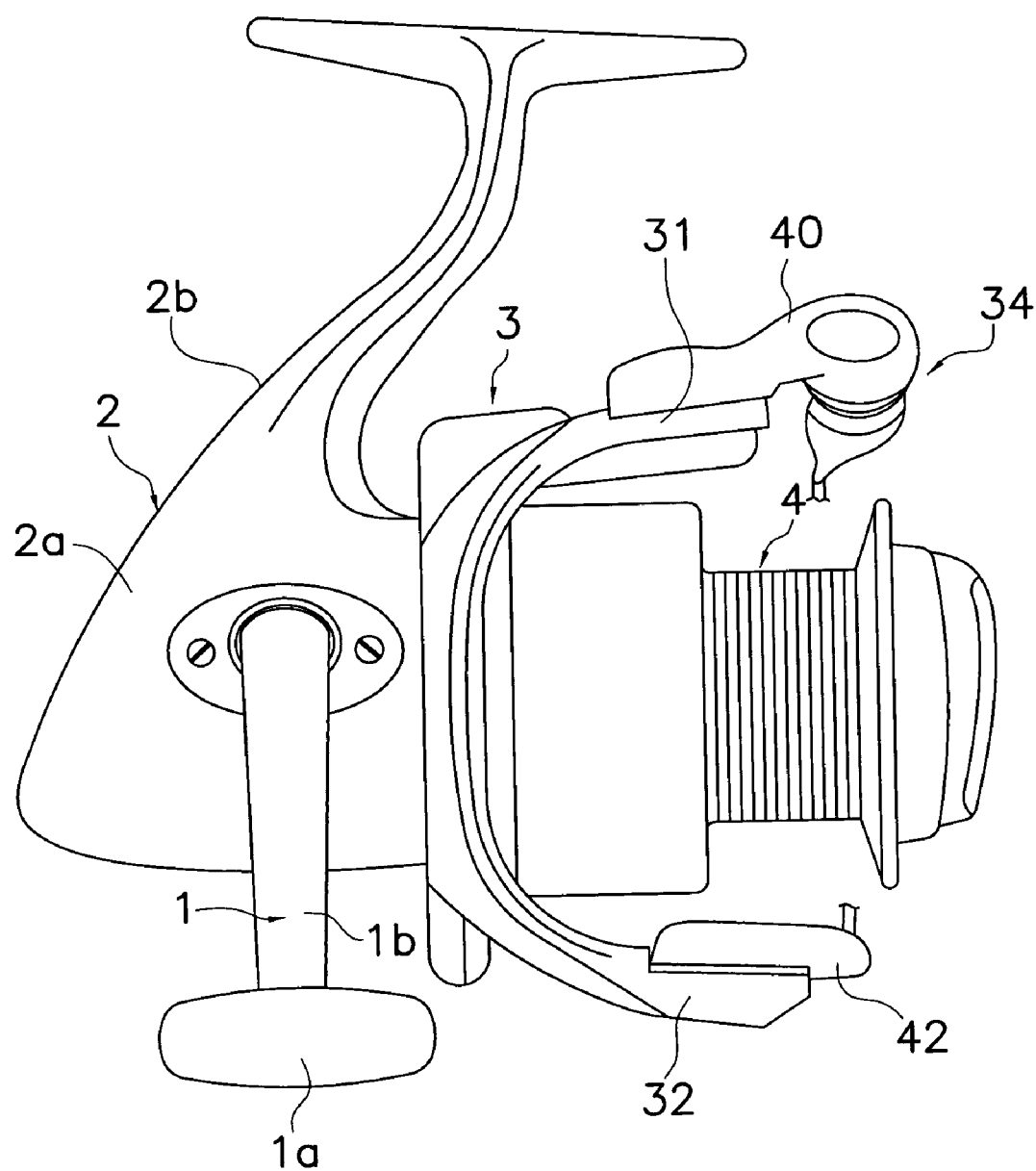
FIG. 1 is a right elevational view of a spinning reel in accordance with a preferred embodiment of the present invention.
Figure 2:
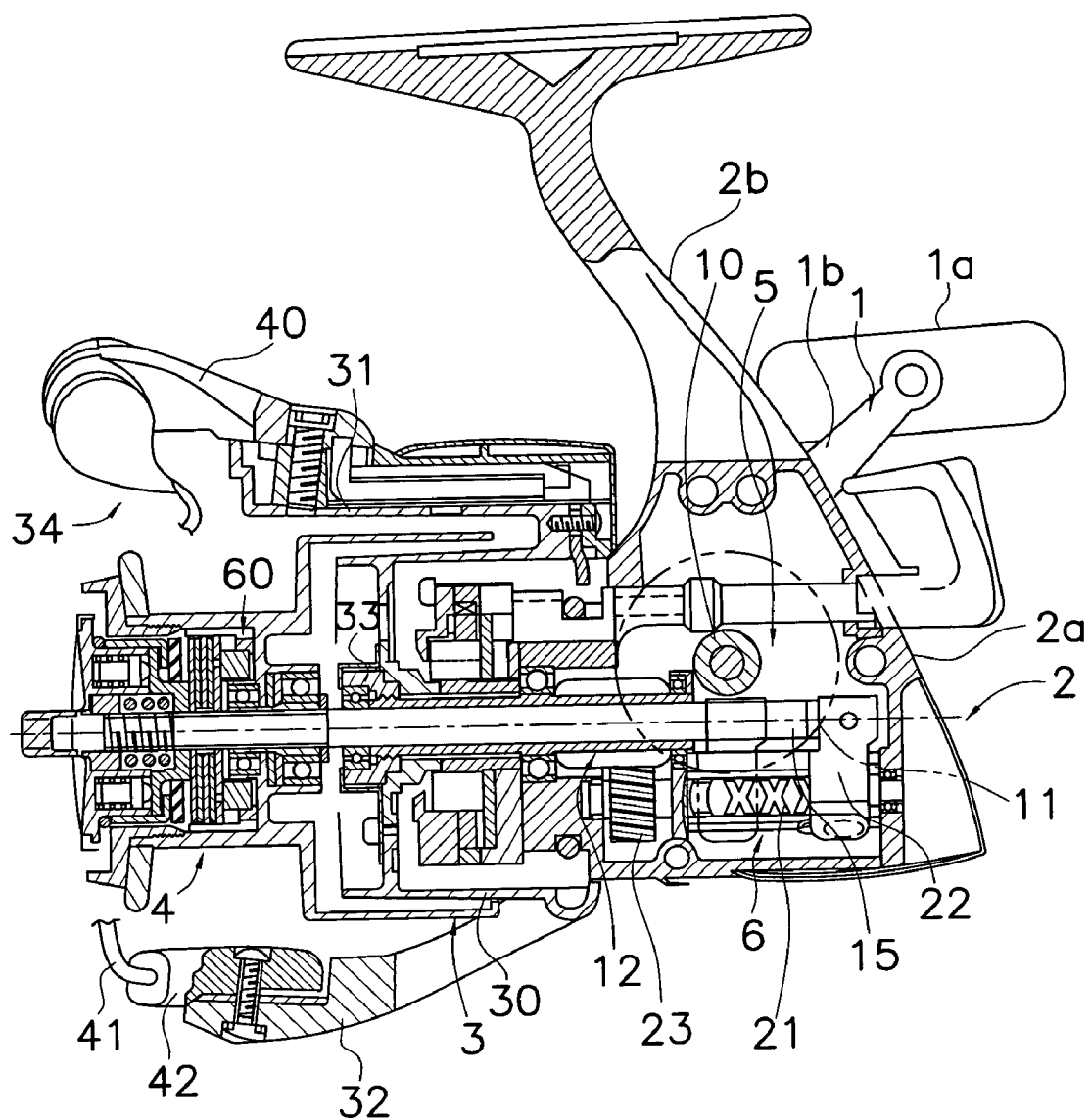
FIG. 2 is a left cross-sectional elevational view of the spinning reel in accordance with a preferred embodiment of the present invention.

As shown in FIGS. 1 and 2, a spinning reel in accordance with a preferred embodiment of the present invention includes a handle 1, a reel unit 2 that rotatively supports the handle 1, a rotor 3, and a spool 4. The rotor 3 is rotatively supported at the front of the reel unit 2. The spool 4 has fishing line wound around the outer peripheral surface thereof, and is disposed at the front of the rotor 3 so that it can be freely moved forward and backward relative to the rotor 3 and reel unit 2.

The handle 1 includes a T-shaped grip portion 1a and an L-shaped crank arm 1b independently rotatively attached to the tip of the grip portion 1a and reel unit 2.

As shown in FIGS. 1 and 2, the reel unit 2 includes a reel body 2a having an opening on its side and a T-shaped rod attachment leg 2b extending diagonally upward to the front and formed integrally with the reel body 2a. As shown in FIG. 2, the reel body 2a has a mechanism accommodating space inside, which accommodates a rotor driving mechanism 5 and an oscillating mechanism 6. The rotor driving mechanism 5 transmits the rotation of the handle 1 to rotate the rotor 3. The oscillating mechanism 6 is provided to wind up uniformly the fishing line by shifting the spool 4 back and forth relative to the reel unit 2.

As shown in FIGS. 1 and 2, the spool 4 is disposed between a first rotor arm 31 and a second rotor arm 32 of the rotor 3, which will be described below. A drag mechanism 60 (see FIG. 2) links the center of the spool 4 to the front end of a spool shaft 15.

As shown in FIG. 2, the rotor driving mechanism 5 includes a handle shaft 10, a master gear 11, and a pinion gear 12. The master gear 11 rotates together with the handle shaft 10, on which the handle 1 is mounted non-rotatively. The pinion gear 12 meshes with the master gear 11. Both ends of the handle shaft 10 are rotatively supported in the reel unit 2 by bearings. Both ends of the handle shaft 10 are provided with female threaded portions of different thread direction and diameter, such that the handle 1 can be mounted non-rotatively to these female thread portions, and thereby accommodating left and right handed operators.

The pinion gear 12 is formed having a hollow tubular shape. The front portion of the pinion gear 12 extends through the center portion of the rotor 3. The pinion gear 12 is secured to the rotor 3 by a nut 33. The middle and the rear end of the pinion gear 12 are rotatively supported by bearings in the reel unit 2.

The oscillating mechanism 6 shifts the spool 4 back and forth relative to the reel unit 2. As shown in FIG. 2, the oscillating mechanism 6 includes a threaded shaft 21, a slider 22, and an intermediate gear 23. The threaded shaft 21 is arranged substantially below the spool shaft 15 and parallel thereto. The slider 22 moves back and forth relative to the reel unit 2 along the threaded shaft 21. The intermediate gear 23 is fixedly coupled to the front end to of the threaded shaft 21. The rear end of the spool shaft 15 is non-rotatably affixed to the slider 22. The intermediate gear 23 meshes with the pinion gear 12.

As shown in FIG. 2, the rotor 3 includes a cylindrical portion 30, a first rotor arm 31, a second rotor arm 23, and a bail arm 34. The cylindrical portion 30 is fixed to the pinion gear 12. The first rotor arm 31 and a second rotor arm 32 are disposed in opposition to one another at the sides of the cylindrical portion 30. The bail arm 34 serves as a fishing line guiding mechanism for guiding fishing line to the spool 4. The cylindrical portion 30 and the first and second rotor arms 31 and 32 can be made, for example, of an aluminum alloy, and are preferably formed as one unitary piece. As noted above, the front and center portions of the cylindrical portion 30 are fixedly coupled non-rotatively to the front portion of the pinion gear 12 with the nut 33.

Figure 3:
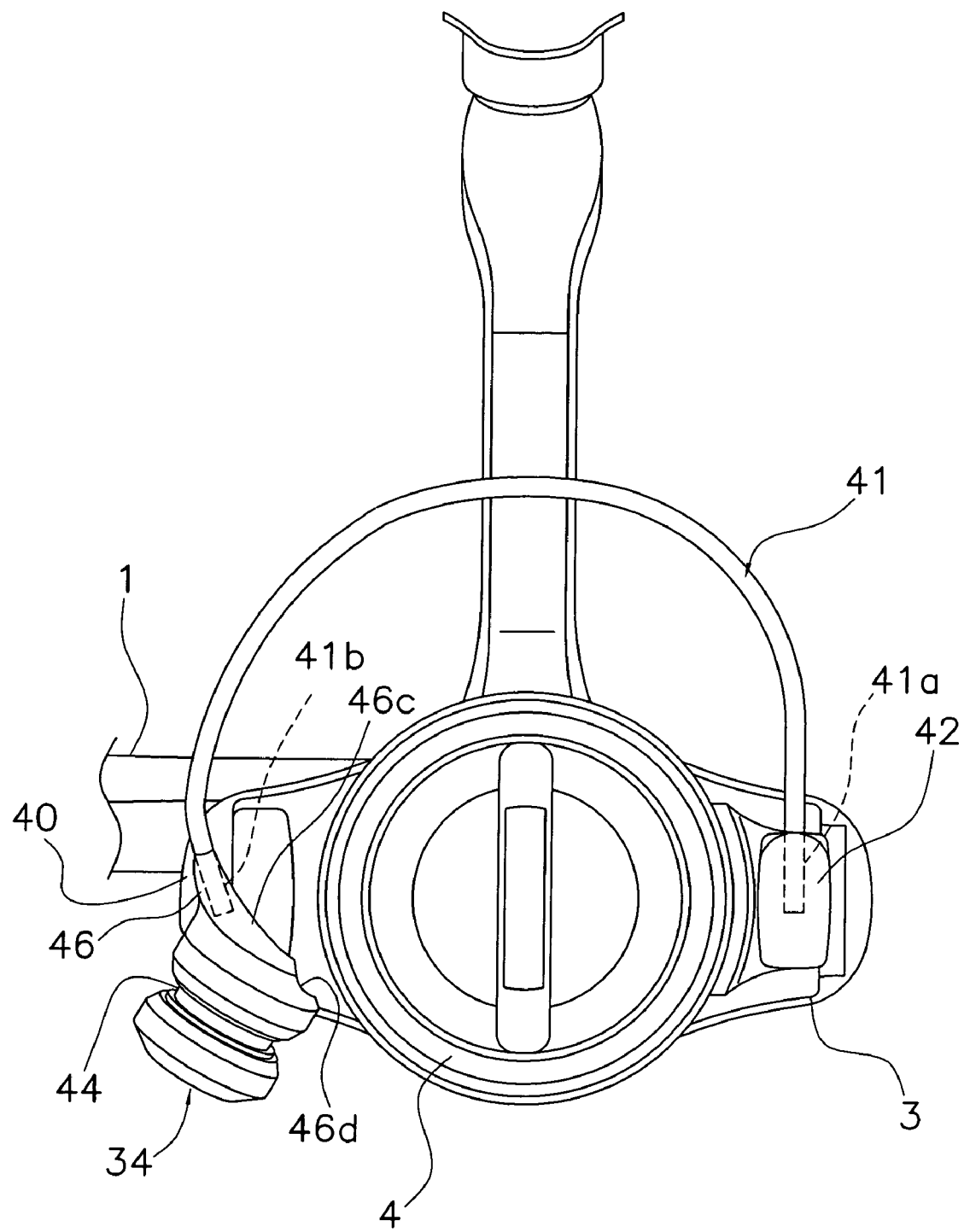
FIG. 3 is a front elevational view of the spinning reel in accordance with a preferred embodiment of the present invention.
Figure 5:
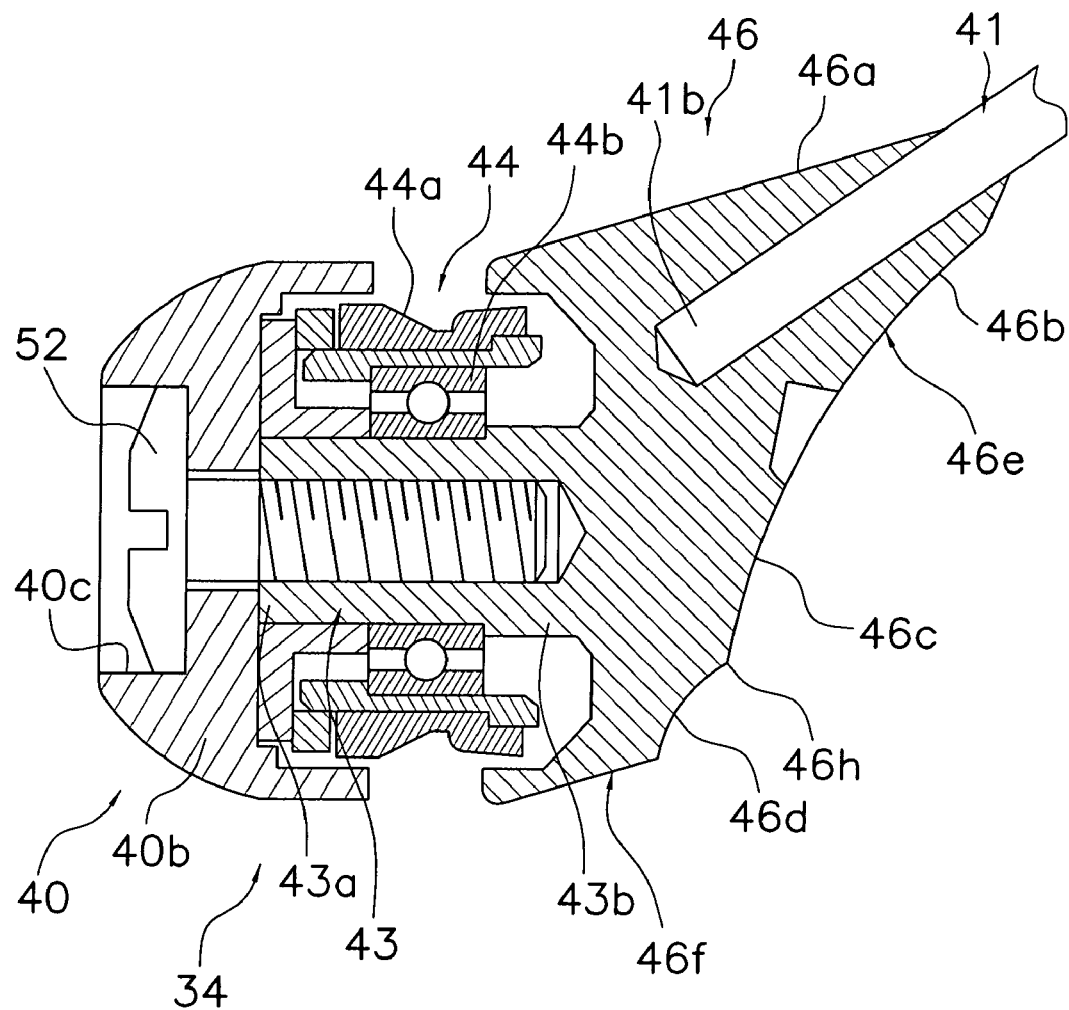
FIG. 5 is a cross-sectional view of the bail arm in accordance with a preferred embodiment of the present invention, illustrating the principal elements.

The bail arm 34 is disposed at the tips of the first rotor arm 31 and the second rotor arm 32, and is pivotable between a line-guiding position and a line-release position. The bail arm 34 includes a first bail support member 40 and a second bail support member 42 pivotably mounted on the tips of the first rotor arm 31 and the second rotor arm 32. The first bail support member 40 is preferably pivotably mounted to an outer side of the first rotor arm 31, and the second bail support member 42 is preferably mounted to an inner side of the second rotor arm 32. As shown in FIGS. 3 and 5, the bail arm 34 includes a bail 41, a fixed shaft 43 (see FIG. 5), a line roller 44, and a fixed shaft cover 46. The bail 41 connects the first bail support member 40 and the second bail support member 42. The fixed shaft 43 has a first end 43a and a second end 43b. The first end of the fixed shaft 43 is fixedly coupled to the first bail support member 40. The line roller 44 is rotatably supported by the fixed shaft 43, which is covered by the fixed shaft cover 46. The second end 43b of the fixed shaft 43 in this embodiment is fixedly connected to the fixed shaft cover, so as to form a one-piece unitary member.

Figure 4:
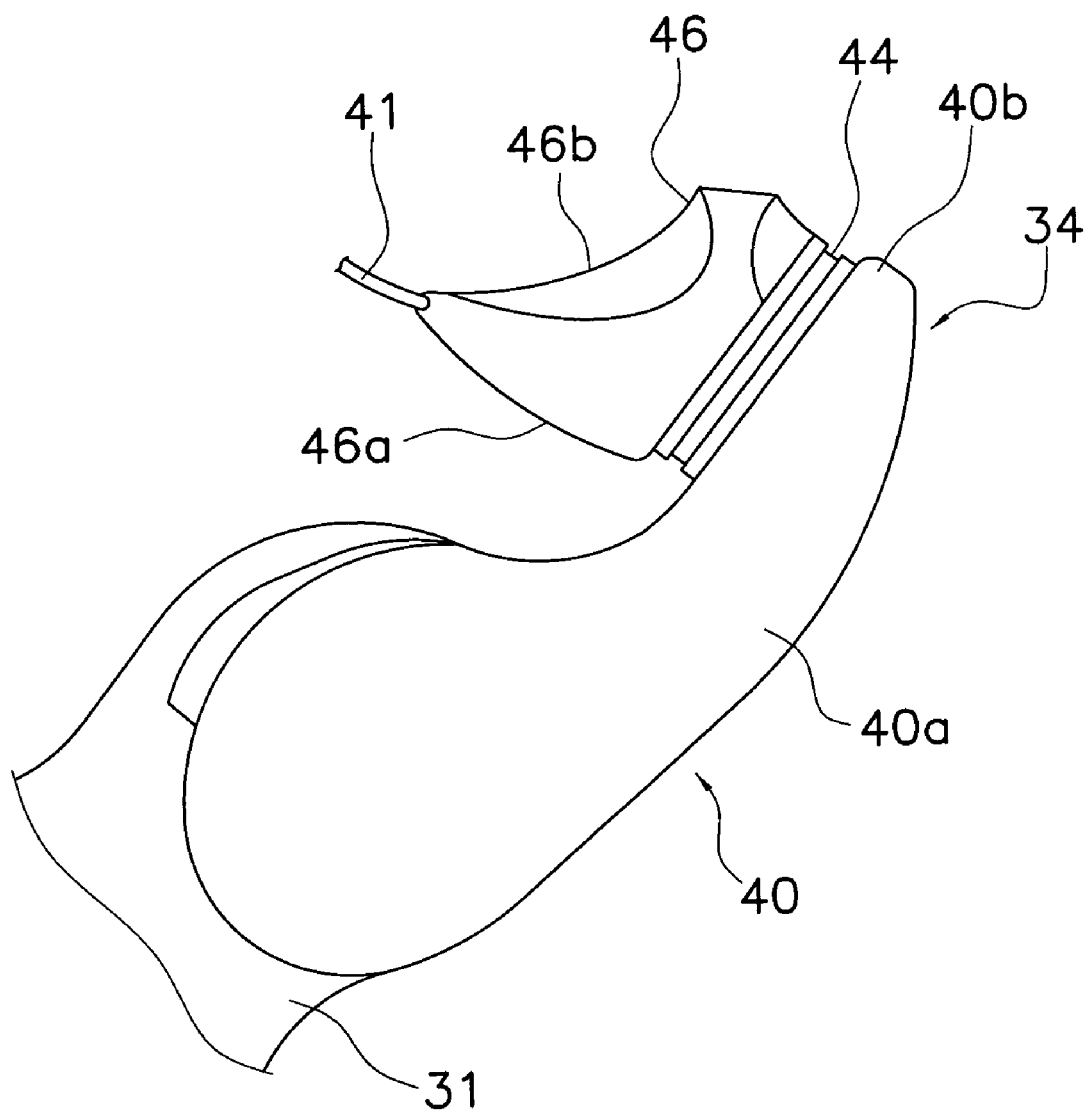
FIG. 4 is a partial, oblique, perspective of view a bail arm in accordance with a preferred embodiment of the present invention, illustrating principal elements thereof.

As shown in FIGS. 4 and 5, the first bail support member 40 includes an arm portion 40a that is pivotably mounted on the first rotor arm 31, and a ring-shaped mounting portion 40b integrally formed with the arm portion 40a. The mounting portion 40b is provided with a stepped through hole 40c (see FIG. 5). Further, a fixing bolt 52 that fixes the fixed shaft 43 to the first bail support member 40 is passed through the through hole 40c.

As shown in FIG. 3, the bail 41 is a wire-shaped member that is preferably caulked on its first end 41a to the second bail support member 42 and on its second end 41b to the fixed shaft cover 46, and curves outward in the circumferential direction around the spool 4. When the bail arm 34 has returned from the line-release position to the line-guiding position, the bail 41 guides the fishing line over the fixed shaft cover 46 to the line roller 44.

As shown in FIG. 5, the fixed shaft 43 is preferably integrally formed in a machining process, such as a cutting process, with the fixed shaft cover 46. The fixed shaft 43 extends from a base shared with the fixed shaft cover 46 toward the first bail support member 40, and its front end is fixed by the fixing bolt 52.

As shown in FIG. 5, the line roller 44 includes a tubular roller 44a whose peripheral surface is provided with a groove for guiding fishing line, and a ball bearing 44b spaced apart from the groove in the axial rotational direction of the line roller 44 on the inner peripheral side of the roller 44a. The roller 44a is rotatively supported by the fixed shaft 43 via the ball bearing 44b.

The fixed shaft cover 46 is provided at the base end of the fixed shaft 43 and spaced apart from the mounting portion 40b of the first bail support member 40, and is preferably formed by a die forming process such as forging. The fixed shaft cover 46 is a substantially cone-shaped member whose vertex is shifted away from the center of the fixed shaft 43, toward the rear of the reel and outward in the radial direction with respect to the spool 4. The bail 41 is preferably caulked and bent from the vertex of the fixed shaft cover 46 toward the side where the fishing line is guided, and is smoothly joined with the crest portion near the vertex.

As shown in FIG. 5, the fixed shaft cover 46 includes a first guide portion 46a and an indented portion 46b. The first guide portion 46a guides the fishing line along its outer circumference. The indented portion 46b is disposed such that the bail 41 of the fixed shaft cover 46 is interposed between the indented portion 46b and the first guide portion 46a. The indented portion 46b is formed at a portion of the fixed shaft cover 46 closest to the spool 4, as an indented portion on the opposite side of the first guide portion 46a. The indented portion 46b includes a first recessed portion 46d and a second recessed portion 46c. The second recessed portion 46c is disposed such that the bail 41 of the fixed shaft cover 46 is interposed between the second recessed portion 46c and the first guide portion 46a. Further, the second recessed portion 46c is formed on the opposite side of the first guide portion 46a. Referring now to FIGS. 3 and 5, the first recessed portion 46d is disposed such that it is connected with at least one portion of the second recessed portion 46c on the side thereof nearest the line roller 44 and is formed by making at a point otherwise closest to the spool 4 recessed. As shown in FIG. 5. the first recessed portion 46d is recessed discontinuously from the second recessed portion 46c with an edge portion 46h. In addition, the fixed shaft cover 46 further includes a conical portion 46e and a cylindrical portion 46f. The conical portion 46e is smoothly joined with one end of the bail 41 near the apex of the conical portion 46e. The cylindrical portion 46f is smoothly and integrally attached to the bottom surface of the conical portion 46e on the side nearest the line roller 44 and which has a diameter that is approximately equal thereto. As shown in FIG. 5, the first recessed portion 46c is recessed discontinuously from the cylindrical portion 46f. Of course, the portion of the cylindrical portion 46f closest to the mounting portion 40b has a larger diameter than the line roller 44 to accommodate the line roller therein. The second recessed portion 46c is formed in the conical portion 46e. The first recessed portion 46d is formed in the cylindrical portion 46f where the cylindrical portion 46f meets the conical portion 46e, such that the first recessed portion 46d is further recessed relative to the second recessed portion 46c and the cylindrical portion 46f.

With this spinning reel, the bail arm 34 falls into the line-release position when the fishing line is let out, e.g., when casting. Thus, the first bail support member 40 and the second bail support member 42 are pivoted. As a result, the fishing line is reeled out from the front side of the spool 4, due to the weight of the tackle attached thereto.

Referring again to FIGS. 1 and 2, when winding the fishing line, the bail arm 34 is returned to a line-winding position. This is achieved automatically with a bail tripping mechanism (not shown in the drawings) when the handle 1 is rotated in the direction in which the fishing line is taken up. The torque of the handle 1 is transmitted via the handle shaft 10 and the master gear 11 to the pinion gear 12. The torque transmitted to the pinion gear 12 is transmitted from the front end of the pinion gear 12 to the rotor 3, and by the intermediate gear 23 meshing with the pinion gear 12 to the oscillating mechanism 6. As a result, the rotor 3 rotates in the direction in which fishing line is taken up, and the spool 4 shifts back and forth relative to the reel unit 2.

As seen in FIG. 3, the fishing line that contacts the bail 41 when the line begins to be taken up is guided by the bail 41 to the fixed shaft cover 46. The fishing line guided by the fixed shaft cover 46 is guided by the line roller 44, its direction is changed by the line roller 44, to be wound around the outer periphery of the spool 4.

Thus, when the fishing line is guided by the line roller 44 and a large amount of tension is applied to the fishing line, the line roller 44 is pushed inward toward the spool 4 by the fishing line. However, as seen in FIGS. 3 and 4, in this spinning reel an indented portion 46b is formed in the fixed shaft cover 46, and has an indented portion in a portion thereof that is on the opposite side of the first guide portion 46a and at a point closest to the spool 4. Due to this structure, even if the line roller 44 is pushed toward the spool 4, it is not necessary to use a reel that is relatively large, and the fixed shaft cover 46 can be prevented from coming into contact with the spool 4, because a sufficient gap is maintained between the spool 4 and the fixed shaft cover 46.

OTHER EMBODIMENTS (a) The above embodiment has been described with reference to a front drag spinning reel, but the present invention can also be applied to any type of spinning reel, such as rear drag spinning reels, spinning reels without drag control, lever drag spinning reels, and the like.

(b) In the above embodiment, as shown in FIG. 5, the fixed shaft 43 is integrally formed with the fixed shaft cover 46, but it is also possible to provide the fixed shaft 43 and the fixed shaft cover 46 as separate elements. Moreover, the bail 41 is fixed to the fixed shaft cover 46, but the present invention is not limited thereto; the bail 41 can also be fixed to the fixed shaft 43.

(c) In the above embodiment, the fixed shaft cover 46 is preferably formed by forging, which is a die forming process, and the fixed shaft 43 is formed by cutting, which is a machining process, but there is no limitation to these types of die forming or machining processes. For example, it is also possible to use molding or die casting for the die forming process.

According to the present invention, in the fishing line guide mechanism of the spinning reel, the fixed shaft cover includes a recessed portion disposed opposite the guide portion such that the bail of the fixed shaft cover is interposed between the recessed portion and the guide portion. Further, the fixed shaft cover has an indented portion in the recessed portion at a point closest to the spool. Thus, increasing the overall size of the reel is unnecessary, and the fixed shaft cover can prevent contact with the spool.

"Means plus function" clauses as utilized in the specification and claims should include any structure that can be utilized to carry out the function of the "means plus function" clause.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-293352. The entire disclosure of Japanese Patent Application No. 2002-293352 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fishing line guide mechanism for a spinning reel that guides fishing line onto a spool, the fishing line guide mechanism being adapted to be mounted to ends of a first rotor arm and a second rotor arm so as to be pivotable between a line-guiding position and a line-release position, said fishing line guide mechanism comprising:
    a first bail support member and a second bail support member being adapted to be pivotably mounted to respective ends of the first rotor arm and the second rotor arm;
    a fixed shaft having first and second ends, said first end being fixedly coupled to said first bail support member;
    a fixed shaft cover fixedly coupled to said second end of said fixed shaft, said fixed shaft cover being spaced apart from said first bail support member;
    a line roller being rotatively supported on said fixed shaft, said line roller having a roller formed thereon, said line roller being configured to guide the fishing line around a peripheral surface thereof; and
    a bail having first and second ends and being configured to guide the fishing line over said fixed shaft cover to said line roller, said first end of said bail being fixedly coupled to said second bail support member, said second end of said bail being fixedly coupled to at least one of said fixed shaft and said fixed shaft cover, said bail being curved outward in a circumferential direction with respect to the spool,
    said fixed shaft cover including,
        a first guide portion being configured to guide fishing line around its outer periphery,
        a first recessed portion being disposed to interpose said second end of said bail between said first recessed portion and said first guide portion, said first recessed portion being formed by making a portion of said fixed shaft cover closest to the spool recessed,
        a conical portion smoothly joined with said second end of said bail near an apex of said conical portion,
        a cylindrical portion smoothly attached to a bottom surface of said conical portion on a side closer to said line roller, said cylindrical portion having a diameter that is substantially equal to that of said bottom surface of said conical portion, said first recessed portion being recessed discontinuously from said cylindrical portion, and
        a second recessed portion disposed such that said second end of said bail is interposed between said second recessed portion and said first guide portion, said first recessed portion being disposed to connect at least partially with said second recessed portion on a side closer to said line roller, said first recessed portion being formed where said conical portion meets said cylindrical portion, said first recessed portion being recessed discontinuously relative to said second recessed portion with an edge portion therebetween.

2. The fishing line guide mechanism according to claim 1, wherein
    said fixed shaft and said fixed shaft cover are formed as a one-piece unitary member.

3. The fishing line guide mechanism according to claim 1, wherein
    said bail is a wire-shaped member that is caulked to said second bail support member and said fixed shaft cover.

4. The fishing line guide mechanism according to claim 1, wherein
    said fixed shaft cover is formed by die-casting.

5. A spinning reel comprising;
    a handle;
    a reel unit rotatably supporting said handle;
    a spool being attached to said reel unit;
    a rotor being rotatively attached to said reel unit and having first and second rotor arms that are pivotable between a line-guiding position and a line-releasing position;
    a first bail support member and a second bail support member being pivotably mounted to respective ends of said first and second rotor arms;
    a fixed shaft having first and second ends, said first end being fixedly coupled to said first bail support member;
    a fixed shaft cover fixedly coupled to said second end of said fixed shaft, said fixed shaft cover being spaced apart from said first bail support member;
    a line roller being rotatively supported on said fixed shaft, said line roller having a roller formed thereon, said line roller being configured to guide the fishing line around a peripheral surface thereof; and a bail having first and second ends and being configured to guide the fishing line over said fixed shaft cover to said line roller, said first end of said bail being fixedly coupled to said second bail support member, said second end of said bail being fixedly coupled to at least one of said fixed shaft and said fixed shaft cover, said bail being curved outward in a circumferential direction with respect to said spool, said fixed shaft cover including, a first guide portion being configured to guide fishing line around its outer periphery, a first recessed portion being disposed to interpose said second end of said bail between said first recessed portion and said first guide portion, said first recessed portion being formed by making a portion of said fixed shaft cover closest to said spool recessed, a conical portion smoothly joined with said second end of said bail near an apex of said conical portion, a cylindrical portion smoothly attached to a bottom surface of said conical portion on a side closer to said line roller, said cylindrical portion having a diameter that is substantially equal to that of said bottom surface of said conical portion, said first recessed portion being recessed discontinuously from said cylindrical portion, and a second recessed portion disposed such that said second end of said bail is interposed between said second recessed portion and said first guide portion, said first recessed portion being disposed to connect at least partially with said second recessed portion on a side closer to said line roller, said first recessed portion being formed where said conical portion meets said cylindrical portion, said first recessed portion being recessed discontinuously relative to said second recessed portion with an edge portion therebetween.

6. The spinning reel according to claim 5, wherein said fixed shaft and said fixed shaft cover are formed as a one-piece unitary member.

7. The spinning reel according to claim 5, wherein said bail is a wire-shaped member that is caulked to said second bail support member and said fixed shaft cover.

8. The spinning reel according to claim 5, wherein said fixed shaft cover is formed by die-casting.

* * * * *